(12) United States Patent
Stefanoff et al.

(10) Patent No.: US 10,532,794 B2
(45) Date of Patent: Jan. 14, 2020

(54) CONTAINER LASHING PROCESS AND SYSTEM

(71) Applicant: PSA INTERNATIONAL PTE LTD, Singapore (SG)

(72) Inventors: Joeri Stefanoff, Antwerp (BE); Edwin Van Ingelghem, Antwerp (BE); Jurgen De Wachter, Antwerp (BE); Raf De Ruysscher, Antwerp (BE)

(73) Assignee: PSA INTERNATIONAL PTE LTD, Singapore (SG)

( * ) Notice: Subject to any disclaimer, the term of this patent is extended or adjusted under 35 U.S.C. 154(b) by 123 days.

(21) Appl. No.: 15/756,672

(22) PCT Filed: Sep. 4, 2015

(86) PCT No.: PCT/IB2015/056741
§ 371 (c)(1),
(2) Date: Mar. 1, 2018

(87) PCT Pub. No.: WO2017/037512
PCT Pub. Date: Mar. 9, 2017

(65) Prior Publication Data
US 2018/0229809 A1 Aug. 16, 2018

(51) Int. Cl.
*B60P 7/13* (2006.01)
*B63B 25/00* (2006.01)
(Continued)

(52) U.S. Cl.
CPC ............ *B63B 25/004* (2013.01); *B60P 7/10* (2013.01); *B60P 7/13* (2013.01); *B60P 7/16* (2013.01);
(Continued)

(58) Field of Classification Search
CPC . B63B 25/004; B63B 25/28; B63B 2025/285; B65D 90/0006; B65D 88/12;
(Continued)

(56) References Cited

U.S. PATENT DOCUMENTS

| | | | | |
|---|---|---|---|---|
| 4,732,516 A | * | 3/1988 | Borchardt | B63B 25/28 410/77 |
| 2003/0215299 A1 | * | 11/2003 | Hsieh | B60P 7/13 410/85 |

FOREIGN PATENT DOCUMENTS

| | | |
|---|---|---|
| DE | 3009257 A1 | 9/1981 |
| DE | 9401740 U1 | 6/1995 |

(Continued)

*Primary Examiner* — Stephen T Gordon
(74) *Attorney, Agent, or Firm* — Browdy and Neimark, PLLC (57) ABSTRACT

A process for lashing containers with a power tool, a lashing rod (2) connectable to a container and a turnbuckle (1) connectable to a container transport vehicle. The turnbuckle comprises a first connection part (14) connectable to the lashing rod and second connection part (15) connectable to the container transport vehicle, the turnbuckle being rotatable around it's longitudinal axis (L). At least one of the connection parts comprises a tensioning part (144) for tensioning the lashing rod by adapting the overall length of the turnbuckle and lashing rod. The tensioning part is driven by a drive part (145) which is operated by a power tool. For lashing a container the turnbuckle is connected to the container transport vehicle and the lashing rod, which is connected to the container. The turnbuckle is rotated until the drive part is accessible by the power tool. Then, the drive part is driven by the power tool.

9 Claims, 4 Drawing Sheets

(51) Int. Cl.
  *B63B 25/28* (2006.01)
  *F16G 11/12* (2006.01)
  *B60P 7/10* (2006.01)
  *B60P 7/16* (2006.01)
  *B61D 45/00* (2006.01)
  *B60P 7/18* (2006.01)
  *B61D 3/20* (2006.01)
  *B64D 9/00* (2006.01)
  *B65D 88/02* (2006.01)
  *B65D 88/12* (2006.01)
  *B65D 90/00* (2006.01)

(52) U.S. Cl.
  CPC ............... *B60P 7/18* (2013.01); *B61D 3/20* (2013.01); *B61D 45/002* (2013.01); *B61D 45/007* (2013.01); *B63B 25/002* (2013.01); *B63B 25/28* (2013.01); *B64D 9/003* (2013.01); *B65D 88/027* (2013.01); *B65D 88/12* (2013.01); *B65D 90/0006* (2013.01); *F16G 11/12* (2013.01); *B63B 2025/285* (2013.01)

(58) Field of Classification Search
  CPC ........ B64D 9/003; B61D 45/007; B61D 3/20; B61D 45/002; B60P 7/13; B60P 7/18; B60P 7/16; B60P 7/10; F16G 11/12
  USPC ...... 410/77, 80, 81, 85, 96, 97, 100; 114/75; 248/499; 403/43–45, 48
  See application file for complete search history.

(56) References Cited

FOREIGN PATENT DOCUMENTS

| | | |
|---|---|---|
| DE | 20203067 U | 9/2002 |
| EP | 2650171 A1 | 10/2013 |
| JP | 59110945 A | 6/1984 |

\* cited by examiner

CONTAINER LASHING PROCESS AND SYSTEM

TECHNICAL FIELD

The present invention relates to a process and a system for lashing containers on a container transport vehicle, such as for example a ship.

BACKGROUND ART

Commonly used systems for lashing containers are known from EP 2 650 171 A1 and DE 202 03 067 U1. Such container lashing systems typically comprise a lashing rod and a turnbuckle. The turnbuckle comprises a first connection part and a second connection part for connecting the turnbuckle respectively to a first end of the lashing rod and to a container transport vehicle, such as for example a ship, a barge or other floating vehicle, or a train. The first connection part and the second connection part of the turnbuckle are connected to each other by two parallel beams which form the main body of the turnbuckle. The lashing rod is provided at a first end for being connected to the turnbuckle and at a second end for being connected to an intermodal freight container or any other type of suitable container on the container transport vehicle.

The first connection part of the turnbuckle comprises a locating seat arranged at a first end of the lashing rod. This locating seat comprises a semi-circular opening behind which locating rings, protruding from the lashing rod at its first end, may be seated for connecting the lashing rod to the turnbuckle. Multiple locating rings are arranged on the lashing rod at equals distances from each other, such that the overall length of the container lashing system formed by the connected lashing rod and turnbuckle may be roughly set by seating different locating rings behind the locating seat. To strengthen the connection between the lashing rod and the turnbuckle multiple locating seats may be provided on the turnbuckle at the same distances from each other as the locating rings on the lashing rod.

The second connection part of the turnbuckle comprises a threaded rod which is arranged through a threaded opening at the second end of the turnbuckle. At one end the threaded rod is provided with a connection element, for example a buckle or a hook, for connecting, either directly or via one or more intermediate lashing rods, to a container transport vehicle, for example for connecting to a deck of a ship or a lashing bridge on a deck of a ship. The threaded rod may be screwed through the threaded opening for precisely controlling the overall length of the container lashing system formed by the connected lashing rod and turnbuckle and thereby tensioning the lashing rod to achieve lashing of the container. When the lashing rod and the turnbuckle are connected to each other and respectively to the shipping container and to the container transport vehicle, the screwing of the threaded rod through the threaded opening is achieved by rotating the turnbuckle around its longitudinal axis. Initially, this may be done by hand, but when the tension on the lashing rod increases a lever tool is used.

Rotating the turnbuckle clockwise increases the tension, securing the container to the ship. Rotating the turnbuckle counterclockwise decreases the tension until the lashing rod and turnbuckle are disconnected. For lashing the container, the turnbuckle is initially rotated by hand. However, when the tension on the turnbuckle increases and manual rotation is no longer possible, then a lever tool is used to rotate the turnbuckle further until the required tension is reached. The lever tool is also used during unlashing for removing the lashing rods. They are used for rotating the turnbuckle until the tension has sufficiently decreased for further rotating the turnbuckle by hand.

The process of lashing containers with such container lashing systems has however the disadvantage that it is time-consuming and not without danger for the person rotating the turnbuckle.

Sufficiently tensioning the lashing rod takes some time because rotating the turnbuckle needs to be done manually and requires a significant amount of force. Rotating the turnbuckle is also tiresome for the person rotating the turnbuckle, such that periods of rest need to be taken into account.

The person rotating the turnbuckle also has to take care that his hands are not caught between the lashing rod, the turnbuckle and/or the lever tool while operating the turnbuckle, which might cause injury.

When using lever tools, workers have to put their body weight into the movement which makes them very vulnerable for accidents. If they push too hard and the turnbuckle suddenly loosens they risk smashing their arms and/or fingers onto parts of the container lashing system or against the container transport vehicle. If they pull too hard they can even fall or trip. In both cases, dangerous situations may quickly arise. Constant pushing and pulling movements may cause injury, such as for example aching muscles in arms and/or shoulders.

DISCLOSURE OF THE INVENTION

It is an aim of the present invention to provide a container lashing process which takes less time, is safer, requires less force to perform, and/or is less labour intensive. Furthermore, it is an aim of the present invention to provide a container lashing system which enables a lashing of containers which takes less time, is safer, requires less force to perform, and/or is less labour intensive.

This aim is achieved according to the invention with a container lashing process showing the technical characteristics of the characterising part of the first claim.

Therefore, the invention provides a container lashing process comprising the steps of:

providing a lashing rod for connecting to a container on a container transport vehicle;
providing a power tool;
providing a turnbuckle for connecting the lashing rod to the container transport vehicle with the lashing rod and the turnbuckle extending along a longitudinal axis, the turnbuckle comprising a first connection part and a second connection part for connecting the turnbuckle respectively to the lashing rod and to a container transport vehicle with the lashing rod and the turnbuckle extending along the longitudinal axis, the first connection part and the second connection part being provided such that the turnbuckle is rotatable around the longitudinal axis while the turnbuckle is connected to the container via the lashing rod and to the container transport vehicle, at least one of the first connection part and the second connection part comprising a tensioning part by means of which the overall length of the connected turnbuckle and lashing rod is adaptable, thereby tensioning the lashing rod for lashing the container to the container transport vehicle, the tensioning part comprising a drive part for driving the tensioning part, and the drive part being arranged for being driven by means of the power tool;

connecting the lashing rod at a first end to the turnbuckle via the first connection part;

connecting the lashing rod at a second end to a container stored on a container transport vehicle;

connecting the turnbuckle to the container transport vehicle via the second connection part;

rotating the turnbuckle, preferably manually, around the longitudinal axis such that the drive part of the tensioning part is accessible by the power tool; and driving the drive part by means of the power tool for lashing the container to the container transport vehicle.

The container lashing process according to the present invention offers the advantage that less manual labour and force is required for lashing containers by means of lashing rods and turnbuckles. The manual labour is limited to connecting the lashing rod, the turnbuckle, the container and the container transport vehicle with each other, and possibly, if necessary, manually rotating or turning the turnbuckle until the tensioning part is accessible by the power tool. Rotating the turnbuckle in principle only requires a rotation of at most 180° and may be performed when the lashing rod and the turnbuckle are still loosely connected without much tension on the lashing rod, and thus requires much less force than further tensioning the lashing rod manually by rotating the turnbuckle. The most intensive part of the process of container lashing, being the further rotation of the turnbuckle to tension the lashing rod sufficiently for lashing the container, which requires much force and exposes the people lashing containers to possible danger, is taken over by driving the drive part by means of the power tool, which requires little to no manual force.

The container lashing process according the present invention also offers the advantage that it may be performed much quicker than container lashing processes requiring the turnbuckle being rotated manually. Using the power tool for driving the drive part and thereby tensioning the lashing rod already speeds up the process. The persons lashing the containers also become less fatigued while lashing the containers because, as described above, the container lashing process according to the present invention requires less manual labour. Therefore, less or even no intermediate rest periods may be needed, which can speed up the process of lashing containers even more.

The turnbuckle being positioned in advance such that the drive part is easily accessible by the power tool also offers the advantage that the person lashing the container can position himself at a safe place with respect to the lashing rod, the turnbuckle and the container. This, as compared to rotating the turnbuckle manually or by means of a lever tool, whereby the person lashing the containers has to position himself at an unsafe place, such as closely to the turnbuckle or between the lashing rod and the turnbuckle on the one hand and the container on the other hand. And the person lashing the containers may also remain positioned in said safe place while driving the drive part by means of the power tool. In this way, the container lashing process according to the present invention has the advantage that the person lashing the containers may be less exposed to possible dangerous situations, and the process is thus much safer to perform. Additionally, since less force is required for lashing the containers, the person lashing the containers is less likely to strain or injure himself.

It should be clear to the skilled person that the advantages of the container lashing process according to the present invention mentioned above also apply for the reversed process of unlashing the containers, i.e. driving the drive part by means of the power tool for releasing the tension from the lashing rod, and subsequently disconnecting the lashing rod, the turnbuckle, the container and the container transport vehicle from each other.

It should be clear to the skilled person that the container lashing process according to the present invention is, in an embodiment, suitable for connecting the turnbuckle with one or more lashing rods to one or more containers via the first connection part, and/or suitable for connecting the turnbuckle to the container transport vehicle via the second connection part either directly or via one or more intermediate lashing rods.

It should be clear that different types of the first connection part and the second connection part known by the skilled person, such as for example locating rings, eyes, hooks, etc. may be used for connecting the turnbuckle respectively to the lashing rod and the container transport vehicle.

In an embodiment of the container lashing process according to the present invention the turnbuckle is rotated, preferably manually, around the longitudinal axis until the drive part of the tensioning part is positioned on a side of the turnbuckle facing away from the container.

This embodiment has the advantage that the drive part is positioned as far away as possible from the container, such that the person lashing the containers may position himself at a safe place as far away as possible from the containers, which improves the safety of the process of lashing containers.

In an embodiment of the container lashing process according to the present invention the container lashing process is performed with a first turnbuckle and a first lashing rod and with a second turnbuckle and a second lashing rod, and the connected first turnbuckle and first lashing rod on the one hand and the connected second turnbuckle and second lashing rod on the other hand are arranged cross-wise with respect to each other.

Containers are commonly lashed with a first set comprising a first turnbuckle and a first lashing rod and a second set comprising a second turnbuckle and a second lashing rod, which are arranged cross-wise with respect to each other. This embodiment of the container lashing process according to the present invention offers the advantage that this type of lashing may be performed easily, quickly and safely without one of the sets hindering the other when it is being installed.

For example, when the first set is installed first, there is obviously no hinder from the second set. If subsequently the second set is installed cross-wise from and overlapping the first set, then there is also little or no hinder from the first set, because the second turnbuckle only needs to be rotated over a limited angle until the drive part of the second turnbuckle is accessible which is still easy to perform at that stage of the container lashing process without requiring much effort by the person rotating the second turnbuckle. In the final step of driving the drive part of the second turnbuckle by means of the power tool, there is also little or no hinder from the first set because the second turnbuckle has already been rotated such that it is easily accessible by the power tool.

In an embodiment of the container lashing process according to the present invention the container lashing process is provided for lashing two stacked containers, the container lashing process is further performed with a third turnbuckle and a third lashing rod and with a fourth turnbuckle and a fourth lashing rod, the first turnbuckle, the first lashing rod, the second turnbuckle and the second lashing rod are used for lashing a first container, the third turnbuckle, the third lashing rod, the fourth turnbuckle and the fourth lashing rod are used for lashing a second container stacked onto the first container, and the connected third turnbuckle and third lashing rod on the one hand and the connected fourth turnbuckle and fourth lashing rod on the other hand are arranged cross-wise with respect to each other.

It should be clear to the person skilled in the art that this an embodiment benefits from the same advantages as the embodiment discussed directly above.

The invention further provides a container lashing system comprising:
- a lashing rod for connecting to a container on a container transport vehicle, and
- a turnbuckle for connecting the lashing rod to the container transport vehicle with the lashing rod and the turnbuckle extending along a longitudinal axis, the turnbuckle comprising a first connection part and a second connection part for connecting the turnbuckle respectively to the lashing rod and the container transport vehicle, the first connection part and the second connection part being provided such that the turnbuckle is rotatable around the longitudinal axis while the turnbuckle is connected to the container via the lashing rod and to the container transport vehicle, at least one of the first connection part and the second connection part comprising a tensioning part by means of which the overall length of the container lashing system is adaptable, thereby tensioning the lashing rod for lashing the container to the container transport vehicle, the tensioning part comprising a drive part for driving the tensioning part, and the drive part being arranged for being driven by means of a predetermined power tool.

The advantages of the container lashing system according to the present invention have already been discussed extensively with respect to the container lashing process according to the present invention. The container lashing system enables a faster, safer and less labour intensive lashing of containers.

It should be clear to the skilled person that the container lashing system according to the present invention is, in an embodiment, suitable for connecting the turnbuckle with one or more lashing rods to one or more containers via the first connection part, and/or suitable for connecting the turnbuckle to the container transport vehicle via the second connection part either directly or via one or more intermediate lashing rods.

It should be clear that different types of the first connection part and the second connection part known by the skilled person, such as for example locating rings, eyes, hooks, etc. may be used for connecting the turnbuckle respectively to the lashing rod and the container transport vehicle.

In an embodiment of the container lashing system according to the present invention the tensioning part comprises a connection element which is moveable along the longitudinal axis of the turnbuckle by means of the drive part.

It should be clear that when the connection element is part of the first connection part, then the connection element is provided for connecting to the lashing rod, and when the connection element is part of the second connection part, then the connection part is provided for connecting to the container transport vehicle, either directly or via an intermediate element such as for example one or more intermediate lashing rods.

This embodiment provides a simple means of adapting the overall length of the container lashing system by moving the connection element, which is either connected to the lashing rod or to the container transport vehicle, along the longitudinal axis of the turnbuckle. Thereby causing the tensioning of the lashing rod when shortening the overall length of the container lashing system.

In an embodiment of the container lashing system according to the present invention the drive part comprises an endless screw, the endless screw being arranged parallel to the longitudinal axis of the turnbuckle, and the endless screw being arranged at a predetermined distance from the longitudinal axis of the turnbuckle.

The inventors have found the endless screw to be a simple means for moving the connection element of the tensioning part along the longitudinal axis of the turnbuckle. The endless screw can provide a precise control of the movement of the connection element and thus of the tensioning of the lashing rod. Furthermore, the endless screw is very suitable as a drive part able to withstand the forces to which the tensioning part is subjected when tensioning the lashing rod and also afterwards during transport, i.e. the endless screw provides a simple means for setting and maintaining the tension.

The endless screw also offers the advantage that it is easily driven from one of its ends or from the side by means of a rotating power tool, such as for example a drill. This enables an easy and quick rotating of the endless screw and thus lashing of the containers.

With driving the endless screw from the side is meant from a direction different from the longitudinal direction extending along the longitudinal axis, preferably a direction within an angle from −60° to 60° from the direction perpendicular to the longitudinal direction, more preferably a direction within an angle from −45° to 45° from the direction perpendicular to the longitudinal direction, even more preferably a direction within an angle from −30° to 30° from the direction perpendicular to the longitudinal direction and yet even more preferably substantially perpendicular to the longitudinal direction.

In an embodiment of the container lashing system according to the present invention the endless screw is arranged parallel to the longitudinal axis of the turnbuckle, and the endless screw is arranged at a predetermined distance from the longitudinal axis of the turnbuckle.

The endless screw being arranged parallel to and at a predetermined distance from the axis of the turnbuckle offers the advantage that sufficient space is available between the endless screw on the one hand and the lashing rod and the remaining parts of the turnbuckle on the other hand, in which space the power tool can be easily and safely positioned, substantially without hindrance, for driving the drive part. This is certainly beneficial when the drive part is driven from one of its ends by means of the power tool. This furthers enhances the ease and safety in the use of the container lashing system according to an embodiment of the present invention.

In an embodiment of the container lashing system according to the present invention the endless screw extends along the longitudinal axis of the turnbuckle.

The endless screw extending along the longitudinal axis offers the advantage of a compact design of the turnbuckle in directions perpendicular to the longitudinal axis of the turnbuckle. When lashing containers, the compact design allows neighbouring turnbuckles to be positioned closer to each other to obtain a more compact lashing, or it. allows more free space to be left between neighbouring turnbuckles to facilitate the manual rotation of the turnbuckles.

In this embodiment the endless screw is preferably provided for being driven from the side to allow for an easy access to the endless screw with the power tool.

In an embodiment of the container lashing system according to the present invention the drive part comprises a tensioning device selected from the list consisting of a pneumatic tensioning device and a hydraulic tensioning device.

The inventors have found the pneumatic tensioning device and the hydraulic tensioning device to be other suitable and simple means for moving the connection element of the tensioning part along the longitudinal axis of the turnbuckle. These tensioning devices can also provide a precise control of the movement of the connection element and thus of the tensioning of the lashing rod. Furthermore, the tensioning devices are very suitable as a drive part able to withstand the forces to which the tensioning part is subjected when tensioning the lashing rod.

In an embodiment of the container lashing system according to the present invention the first connection part and the second connection part are provided such that the turnbuckle is rotatable around the longitudinal axis over an angle of at least 90°, and preferably at least 180°.

Being able to rotate the turnbuckle over an angle of at least 90° offers the advantage that even when the drive part of the tensioning part is positioned on a side of the turnbuckle facing towards the container, it is possible to rotate the turnbuckle in such a way that the drive part may be accessed from the sides of the container lashing system, i.e. from a direction perpendicular to the direction facing towards the container. In this way the person operating the power tool for driving the drive part does not have to position himself in any unsafe position between the container on the one hand and the lashing rod and the turnbuckle on the other hand.

Being able to rotate the turnbuckle over an angle of at least 180° offers the advantage that even when the drive part of the tensioning part is positioned on a side of the turnbuckle facing towards the container, it is possible to rotate the turnbuckle such that the drive part is positioned on a side of the turnbuckle facing away from the container. In this way the drive part may be positioned as far away as possible from the container, such that the person operating the power tool for driving the drive part may position himself at a safe position as far away as possible from the container.

In an embodiment of the container lashing system according to the present invention the container lashing system further comprises a sensing device for measuring the tension of the lashing rod.

This embodiment offers the advantage that the tension of the lashing rod may be monitored while the turnbuckle is being rotated manually and while the drive part is being driven by the power tool for lashing the container. In this way, it can be assured that the tension of the lashing rod is sufficient to obtain a proper lashing of the container, but not so high that it might possibly cause damage to the turnbuckle or the lashing rod.

This embodiments also offers the advantage that even after the lashing is done the tension of the lashing rods may be monitored, such that possible problems with the lashing may be detected and corrected in a timely manner.

The sensing devices are therefore very beneficial for use in quality control of the lashing, and therefore improve the safety of the lashing.

In further embodiments of the container lashing system according to the present invention, the sensing device may be provided for communication with a central unit monitoring the tension of one or more lashing rods. Said central monitoring unit may be provided for communicating problems with the tension of the lashing rod, for example to the people lashing the containers or a central operator, such that the tension of the lashing rod may be adjusted accordingly, for example while lashing the containers or during transport of the containers. Additionally, the power tool for driving the drive part may be provided on the turnbuckle, and provided for communicating with the central unit, such that the central unit may for example control the power tool for changing the tension of the lashing rod based on data about the tension of the lashing rod obtained from the sensing device, or such that for example the tension of the lashing rod may be controlled centrally by a central operator.

So in embodiments according to the present invention, the drive part and the power tool may form an integrated drive unit, integrated on the turnbuckle and configured for being operated by the central unit. The integrated drive unit may be electric, e.g. comprising an electric motor and operated by signals generated in the central unit, or hydraulic or pneumatic, e.g. comprising a piston connected to a hydraulic or pneumatic system with valves operated by the central unit.

In an embodiment of the container lashing system according to the present invention the sensing device is arranged on one of the lashing rod and the turnbuckle.

This embodiment offers the advantage that the sensing device may remain on the lashing rod or the turnbuckle when the lashing of the containers has finished. In this way the sensing device may also be used after the lashing, for example during the transport of the containers, for controlling the quality of the lashing, such that possible problems with the lashing may be detected and corrected in a timely manner.

In an embodiment of the container lashing system according to the present invention the container lashing system further comprises the predetermined power tool, wherein the predetermined power tool is provided with the sensing device.

This embodiment offers the advantage that not every lashing rod and/or turnbuckle needs to be provided with the sensing device for being able to monitor the tension of the lashing rod while driving the drive part of the turnbuckle for tensioning the lashing rod. In this case only one sensing device is required on the power tool, instead of multiple sensing devices for each of the lashing rods and/or turnbuckles, which is economically beneficial.

Providing the sensing device on the power tool also offers the advantage that the power tool may easily be configured to automatically stop driving the drive part of the tensioning part when the proper tension of the lashing rod for lashing the containers has been reached. In this way possible damage to the lashing rod and the turnbuckle caused by a too large tension on the lashing rod may be prevented, and also possible damage to the power tool itself may be prevented.

In an embodiment of the container lashing system according to the present invention the container lashing system comprises at least one further turnbuckle and at least one further lashing rod.

BRIEF DESCRIPTION OF THE DRAWINGS

The invention will be further elucidated by means of the following description and the appended figures.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Within the context of the present invention, the term "container" is meant to represent a reusable transport and storage unit for moving products and raw materials between different locations, preferably an intermodal freight container.

Within the context of the present invention, the term "container transport vehicle" is meant to represent any vehicle suitable for transporting containers, such as for example a ship, a barge or other floating vehicle, or a train.

Within the context of the present invention, the term "endless screw" is meant to represent a screw which is fixed such that it does not move longitudinally as it rotates but instead forces a mechanical part to advance. In the context of the present invention this mechanical part is a connection element for connecting the turnbuckle to the lashing rod or to the container transport vehicle.

Within the context of the present invention, the term "overall length" of the container lashing system or of the connected lashing rod and turnbuckle is meant to represent the total length of the turnbuckle and the lashing rod combined when the lashing rod and the turnbuckle are connected with each other, said length being measured from the second end of the lashing rod to the second end of the turnbuckle, and more specifically from the connection element arranged at the second end of the lashing rod to the connection element arranged at the second end of the turnbuckle.

Figure 1:
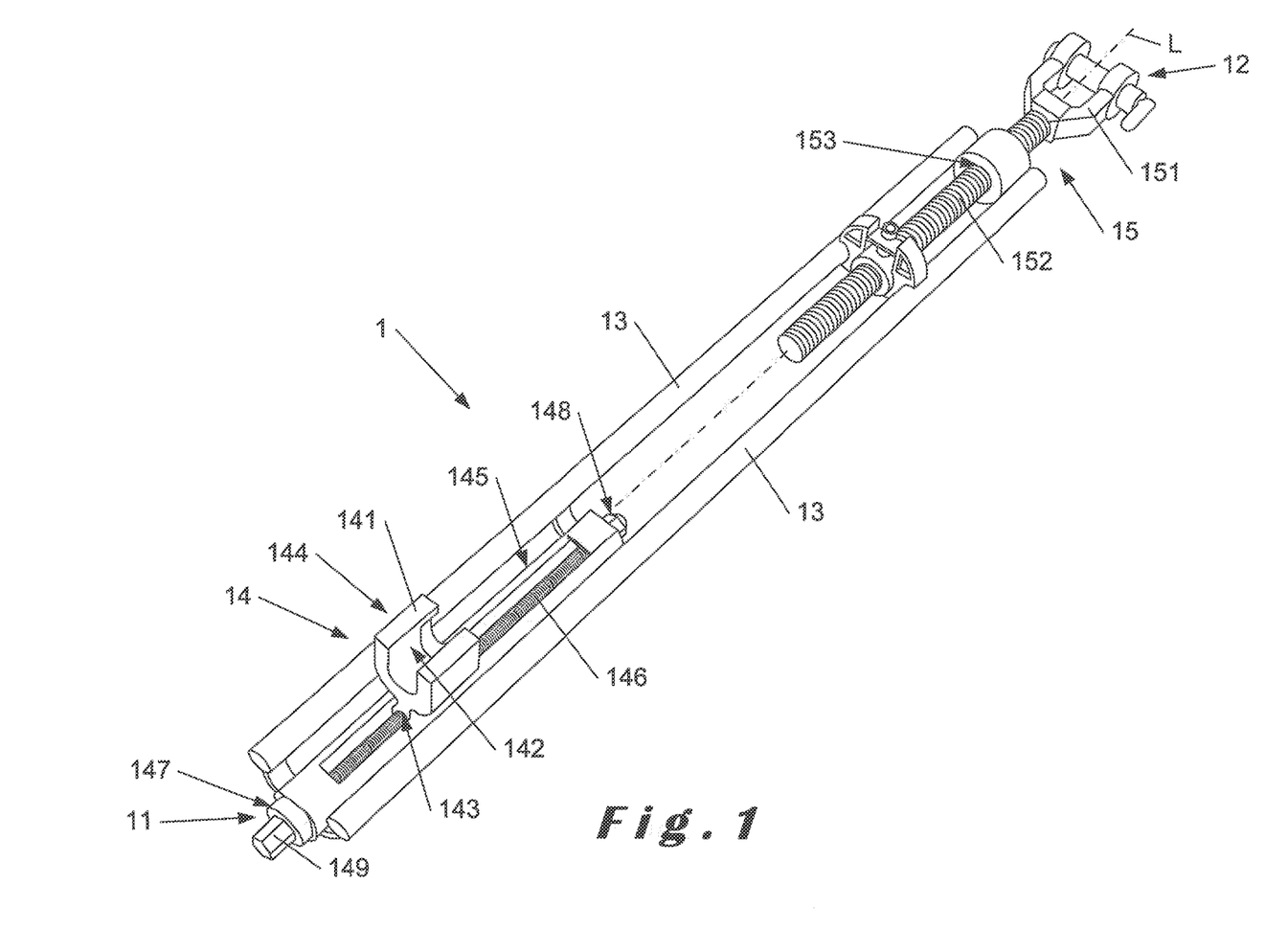
FIG. 1 shows a perspective view of a turnbuckle of the container lashing system according to an embodiment of the present invention.
Figure 2:
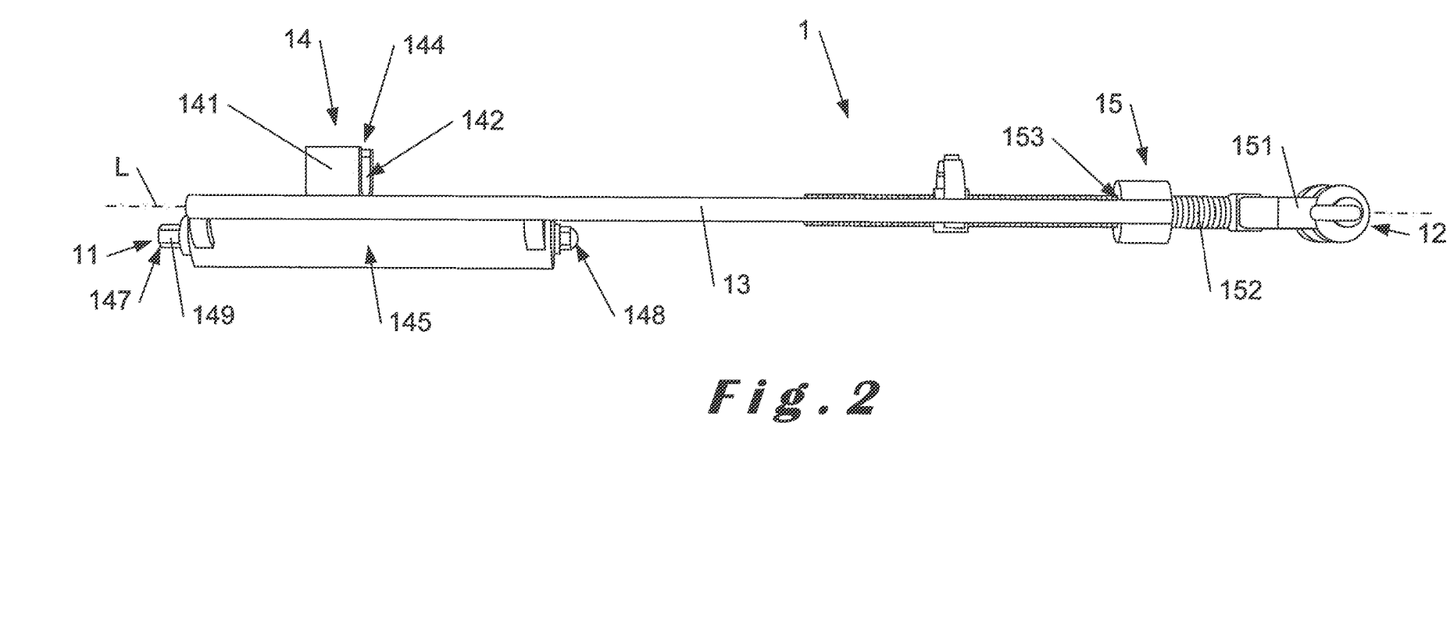
FIG. 2 shows a side view of the turnbuckle of FIG. 1.
Figure 3:
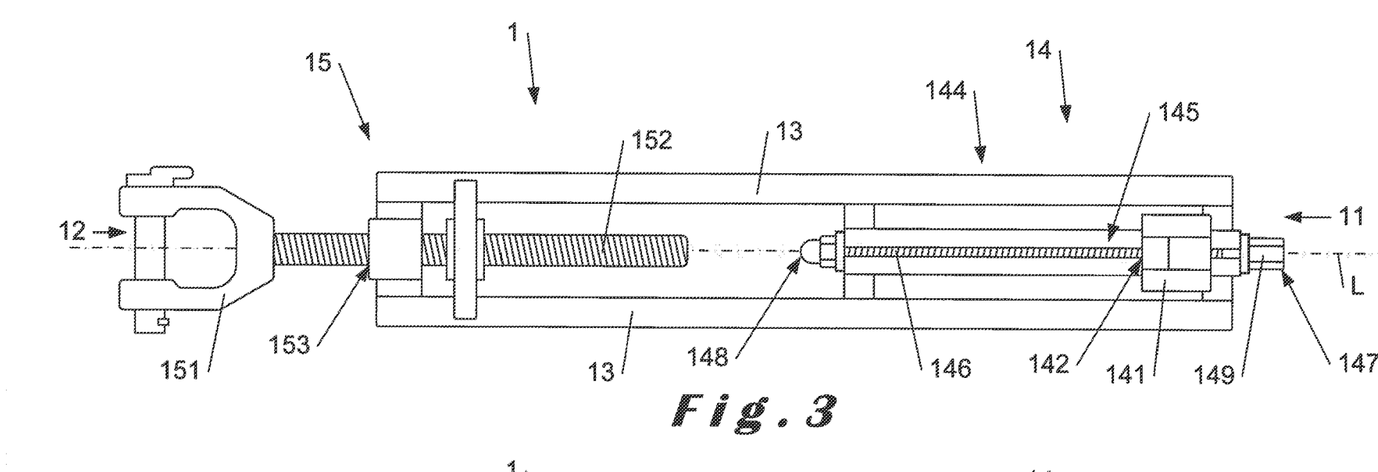
FIG. 3 shows a top view of the turnbuckle of FIG. 1 with the connection element located at the first end of the endless screw.
Figure 4:
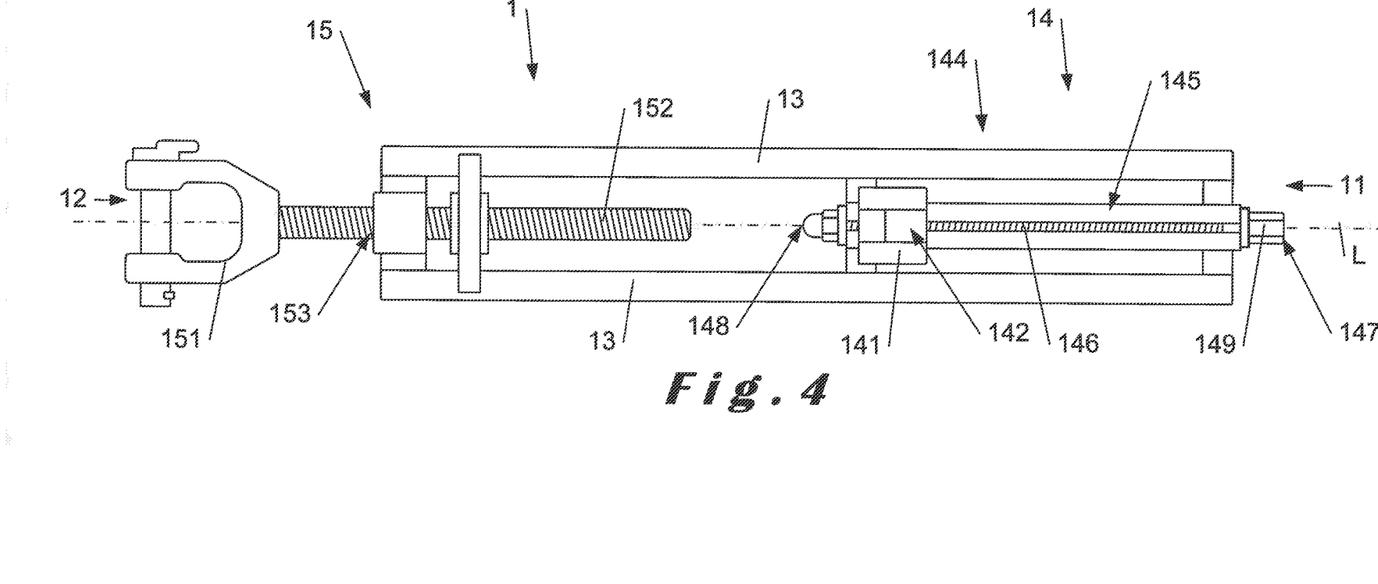
FIG. 4 shows a top view of the turnbuckle of FIG. 1 with the connection element located at the second end of the endless screw.
Figure 5:
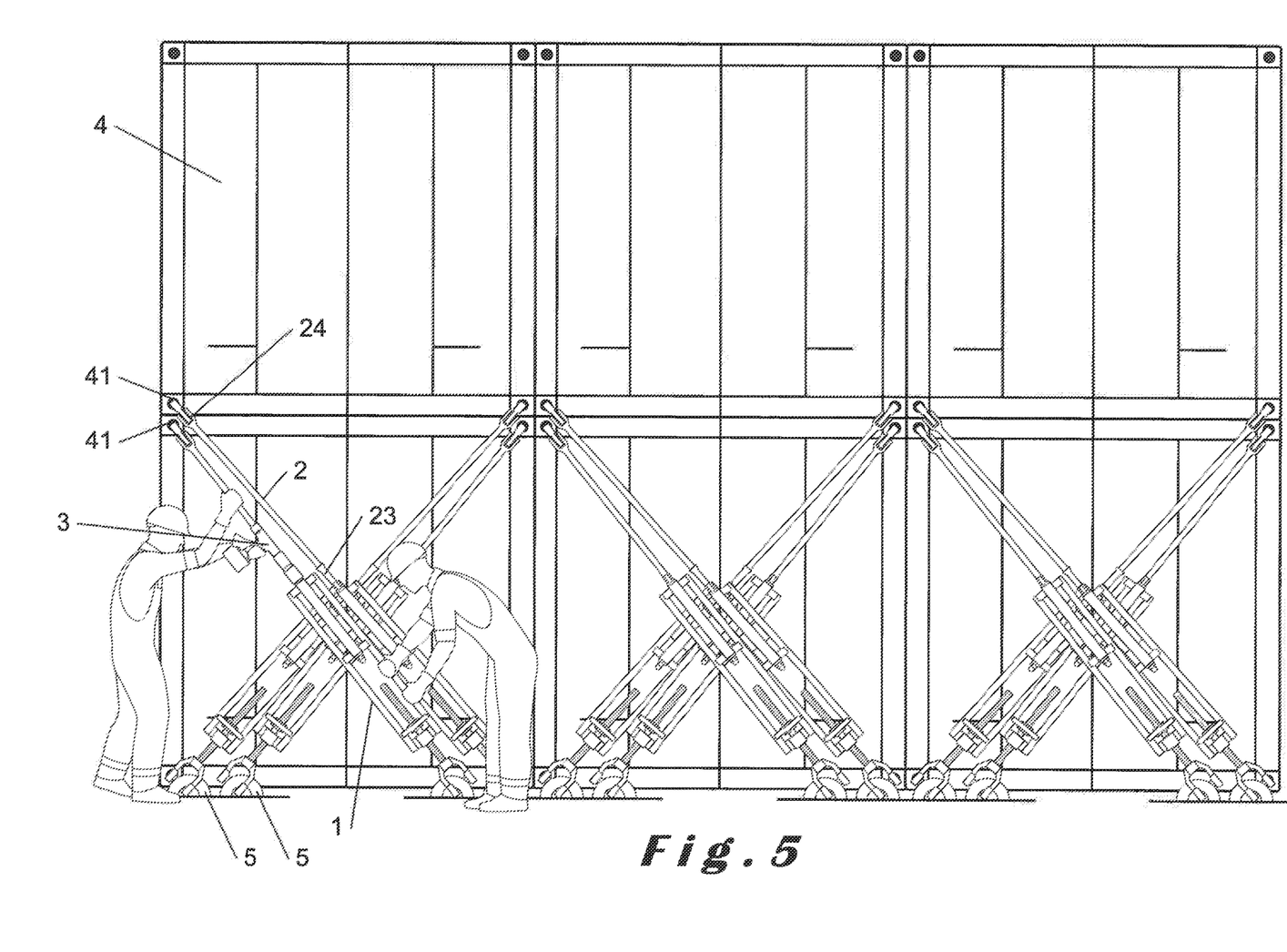
FIG. 5 shows the container lashing system according to an embodiment of the present invention during a step of the container lashing process according to an embodiment of the present invention.

FIGS. 1 and 2 respectively show a perspective view and a side view of a turnbuckle 1 of a container lashing system according to an embodiment of the present invention, which container lashing system is shown in its entirety in FIG. 5. FIGS. 3 and 4 show a top view of the turnbuckle 1. This embodiment of the container lashing system and the container lashing process associated therewith will now be discussed in more detail with respect to these figures.

The turnbuckle 1 comprises a main body formed by two parallel beams 13 extending along a longitudinal axis L of the turnbuckle 1. At the first end 11 of the turnbuckle 1 there is arranged a first connection part 14 which is provided for connecting the turnbuckle 1 to the lashing rod 2 of the container lashing system. At the second end 12 of the turnbuckle 1 there is arranged a second connection part 15 which is provided for connecting the turnbuckle 1 to a container transport vehicle, for example for connecting the turnbuckle 1 to the deck of a ship or to a lashing bridge on the deck of a ship.

The first connection part 14 comprises a connection element 141, more specifically a locating seat 141, for connecting to a lashing rod 2. The locating seat 141 comprises a semi-circular opening 142 behind which locating rings 23, protruding from the lashing rod 2 at its first end 21, may be seated for connecting the lashing rod 2 to the turnbuckle 1. The locating seat 141 and the lashing rod 2 are provided such that the turnbuckle 1 is rotatable around the longitudinal axis L with respect to the lashing rod 2 when the lashing rod 2 and the turnbuckle 1 are connected to each other, i.e. when one of the locating rings 23 of the lashing rod 2 is seated behind the locating seat 141 of the turnbuckle 1.

The second connection part 15 of the turnbuckle 1 comprises a threaded rod 152 which is arranged through a threaded opening 153 at the second end 12 of the turnbuckle 1. At one end the threaded rod 152 is provided with a connection element 151, for example a buckle 151, for connecting to a container transport vehicle. This configuration allows the turnbuckle 1 to be rotated around the longitudinal axis L with respect to the container transport vehicle when the turnbuckle 1 is connected to the container transport vehicle.

The first connection part 14 and the second connection part 15 of the turnbuckle 1 are however not limited to the types described with respect to this embodiment. It should be clear that any other suitable connection parts known by the skilled person may be used, such as for example hooks or eyes.

The first connection part 14 of the turnbuckle 1 comprises a tensioning part 144 for tensioning the lashing rod 2 by adapting the overall length of the container lashing system, i.e. the overall length of the turnbuckle 1 and the lashing rod 2 connected to each other and connected respectively to the container transport vehicle and to the container 4.

The tensioning part 144 is formed by the locating seat 141 which is arranged in such a way onto the turnbuckle 1 that the locating seat 141 is moveable along the longitudinal axis L of the turnbuckle 1. When the overall length of the connected turnbuckle 1 and lashing rod 2 is shortened, the moving locating seat 141 pulls on the locating ring 23 of the lashing rod 2 which is seated behind the locating seat 141. This causes the tensioning of the lashing rod 2 required for lashing the container 4.

The tensioning part 144 is driven by a drive part 145, which is in this embodiment formed by an endless screw 146 which is arranged parallel to the longitudinal axis L of the turnbuckle 1. The endless screw 149 engages with a threaded opening 143 provided on the locating seat 141 in such a way that a rotation of the endless screw 146 moves the locating seat 141 along the longitudinal direction L of the turnbuckle 1. Two extreme positions of the locating seat 141 along the longitudinal axis L of the turnbuckle 1 are shown in FIGS. 3 and 4. In FIG. 3 the locating seat 141 is positioned at a first position at a first end 147 of the endless screw 146 which is arranged close to the first end 11 of the turnbuckle 1. The first position of the locating seat 141 corresponds to a maximum overall length of the connected turnbuckle 1 and lashing rod 2. In FIG. 4 the locating seat 141 is positioned at a second position at a second end 148 of the endless screw 146 which is arranged more central on the turnbuckle 1. The second position of the locating seat 141 corresponds to a minimum overall length of the connected turnbuckle 1 and lashing rod 2.

The endless screw 146 is provided for being driven by means of a power tool 3 via a power tool connector 149 arranged at the first end 147 of the endless screw 146. As can be seen in FIG. 2, the endless screw 146 is positioned at a predetermined distance from the longitudinal axis, and thus from the main body, of the turnbuckle 1, such that sufficient space is available to position the power tool 3 besides the turnbuckle 1 for driving the endless screw 146.

According to the present invention, generally a drive part 145 is provided on the turnbuckle 1 which is arranged for being driven by means of a power tool 3, which in turn drives the tensioning part 144. This means that the drive part 145 is configured for mating with the power tool 3, e.g. comprises a power tool connector 149 in the form of a screw head 149 that can be rotated by means of a power drill 3 and is fixed on the endless screw 146 or another part that drives the tensioning part 144.

In alternative embodiments the drive part 145 may comprise a pneumatic tensioning device or a hydraulic tensioning device, e.g. a piston or the like, for moving the locating seat 141 or any other suitable connection element along the longitudinal axis L of the turnbuckle 1.

The container lashing process according to an embodiment of the present invention will now be discussed in more detail with respect to FIG. 5.

In a first step the turnbuckle 1, the lashing rod 2, the container 4 and the container transport vehicle are connected with each other.

The turnbuckle 1 is connected to the container transport vehicle by connecting the connection element 24 on the threaded rod 152 of the second connection part 15 with the container transport vehicle, more specifically with a connection element 5 on the container transport vehicle which is provided thereto.

The lashing rod 2 is connected to the turnbuckle 1 by positioning the first end 21 of the lashing rod 2 through the semi-circular opening 142 of the locating seat 141 of the first connection part 14 and seating one of the locating rings 23 on the first end 21 of the lashing rod 2 behind the locating seat 141. The lashing rod 2 is connected to the container 4 by arranging a connection element 24 provided at the second end 22 of the lashing rod 2 in a connection slot 41 of the container 4 which is provided thereto.

After the different parts of the container lashing system according to an embodiment of the present invention have been connected with each other and with the container 4 and the container transport vehicle, the turnbuckle 1 is initially rotated around the longitudinal axis L with respect to the lashing rod 2 and the container transport vehicle until the drive part 145 of the tensioning part 144 is easily accessible with the power tool 3, preferably until the drive part 145 is positioned on a side of the turnbuckle 1 which is facing away from the container 4. This optimal orientation of the turnbuckle 1 with respect to the container is shown in FIG. 5. Only a rotation of at most 180° around the longitudinal axis L of the turnbuckle 1 is required to position the drive part 145 on a side of the turnbuckle 1 facing away from the container 4, which may be done quickly and without much effort.

This initial rotation of the turnbuckle 1 is preferably performed manually, but may also be performed with the aid of a lever tool. The lever tool may for example be a simple lever bar which is insertable between the two parallel beams 13 of the turnbuckle 1. The lever tool may for example also be a tool having a lever arm part provided with a gripping part for gripping onto the turnbuckle, such as for example a wrench or a lever bar with a gripping hook, a U-shaped gripping part or any other type of suitable gripping part.

For tensioning the lashing rod 2 and thereby lashing the container 4 as shown in FIG. 5, the power tool 3 is then positioned on the power tool connector 149 provided at the first end 21 of the lashing rod 2 for driving the endless screw 146 in such a way that the overall length of the connected turnbuckle 1 and lashing rod 2 is shortened, thus by moving the locating seat 141 of the first connection part 14 in a direction going from the first position of the locating seat 141 towards the second position of the locating seat 141. Because a power tool 3 is used this may be done quickly and without much effort.

This process may be repeated with additional sets of turnbuckles 1 and lashing rods 2 for lashing a plurality of containers 4 arranged side by side and stacked on top of each other, such as shown in FIG. 5.

LIST OF REFERENCES

L longitudinal axis
1 turnbuckle
11 first end turnbuckle
12 second end turnbuckle
13 parallel beam
14 first connection part
141 locating seat
142 semi-circular opening
143 threaded opening locating seat
144 tensioning part
145 drive part
146 endless screw
147 first end endless screw
148 second end endless screw
149 power tool connector
15 second connection part
151 connection element second connection part
152 threaded rod
153 threaded opening
2 lashing rod
21 first end lashing rod
22 second end lashing rod 23 locating ring
24 connection element second end lashing rod
3 power tool
4 container
41 connection slot container

The invention claimed is:

1. A container lashing system comprising:
a lashing rod (2) for connecting to a container (4) on a container transport vehicle, and
a turnbuckle (1) for connecting the lashing rod (2) to the container transport vehicle with the lashing rod (2) and the turnbuckle (1) extending along a longitudinal axis (L),
the turnbuckle (1) comprising a first connection part (14) and a second connection part (15) for connecting the turnbuckle (1) respectively to the lashing rod (2) and the container transport vehicle, the first connection part (14) and the second connection part (15) being provided such that the turnbuckle (1) is rotatable around the longitudinal axis (L) while the turnbuckle (1) is connected to the container (4) via the lashing rod (2) and to the container transport vehicle, at least one of the first connection part (14) and the second connection part (15) comprising a tensioning part (144) by means of which the overall length of the container lashing system is adaptable, thereby tensioning the lashing rod (2) for lashing the container (4) to the container transport vehicle, the tensioning part (144) comprising a drive part (145) for driving the tensioning part (144), the drive part (145) comprising an endless screw (146) extending along the longitudinal axis (L) of the turnbuckle, and the drive part (145) being arranged for being driven by means of a predetermined power tool (3).

2. The container lashing system according to claim 1, wherein the tensioning part (144) comprises a connection element (141) which is moveable along the longitudinal axis (L) of the turnbuckle (1) by means of the drive part (145).

3. The container lashing system according to claim 1, wherein the drive part (145) comprises a power tool connector (149) arranged at a first end (147) of the endless screw (146).

4. The container lashing system according to claim 1, wherein the drive part (145) comprises a tensioning device selected from the list consisting of a pneumatic tensioning device and a hydraulic tensioning device.

5. The container lashing system according to claim 1, wherein the first connection part (14) and the second connection part (15) are provided such that the turnbuckle (1) is rotatable around the longitudinal axis (L) over an angle of at least 90°, and preferably at least 180°.

6. The container lashing system according to claim 1, further comprising a sensing device for measuring the tension of the lashing rod (2).

7. The container lashing system according to claim 6, wherein the sensing device is arranged on one of the lashing rod (2) and the turnbuckle (1).

8. The container lashing system according to claim 6, further comprising the predetermined power tool (3), wherein the predetermined power tool (3) is provided with the sensing device.

9. The container lashing system according to claim 1, comprising at least one further turnbuckle (1) and at least one further lashing rod (2).

* * * * *